(12) United States Patent
Asukai et al.

(10) Patent No.: US 7,521,624 B2
(45) Date of Patent: Apr. 21, 2009

(54) CONTENT REPRODUCTION LIST GENERATION DEVICE, CONTENT REPRODUCTION LIST GENERATION METHOD, AND PROGRAM-RECORDED RECORDING MEDIUM

(75) Inventors: Masamichi Asukai, Kanagawa (JP); Katsuya Shirai, Kanagawa (JP); Makoto Inoue, Tokyo (JP); Akane Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 11/705,356

(22) Filed: Feb. 12, 2007

(65) Prior Publication Data

US 2007/0193438 A1   Aug. 23, 2007

(30) Foreign Application Priority Data

Feb. 13, 2006 (JP) ............... JP2006-035044
Jan. 22, 2007 (JP) ............... JP2007-011085

(51) Int. Cl.
*G10H 1/00* (2006.01)

(52) U.S. Cl. ............... 84/612; 84/636; 84/714

(58) Field of Classification Search ............ 84/612, 84/636, 652, 668, 714; 707/104.1
See application file for complete search history.

(56) References Cited

U.S. PATENT DOCUMENTS

2002/0091049 A1   7/2002   Hisano et al.

2006/0107822 A1 *   5/2006   Bowen ................... 84/612
2007/0044641 A1 *   3/2007   McKinney et al. ......... 84/612
2007/0074619 A1 *   4/2007   Vergo .................... 84/612
2008/0126384 A1 *   5/2008   Toms et al. .............. 707/102

FOREIGN PATENT DOCUMENTS

| EP | 1162621 A1 | 12/2001 |
| EP | 1512370 A1 | 3/2005 |
| JP | 2005-156641 | 6/2005 |
| WO | WO 02/062425 A1 | 8/2002 |
| WO | WO 2004/072767 A2 | 8/2004 |
| WO | WO 2005/082472 A1 | 9/2005 |

* cited by examiner

*Primary Examiner*—David S. Warren
(74) *Attorney, Agent, or Firm*—Wolf, Greenfield & Sacks, P.C.

(57) ABSTRACT

A content reproduction list generation device includes an operation section, a storage section, and a reproduction list generation section. The storage section is configured to store a change pattern indicating reproduction tempo changes during content reproduction. The reproduction list generation section is configured to specify a change pattern in accordance with an input into the operation section, associate content with the specified change pattern, and generate a content reproduction list for informing a reproduction section of the reproduction order and reproduction tempo of content to be reproduced in accordance with the specified change pattern and the associated content.

17 Claims, 9 Drawing Sheets

HILL MODE
(HILL PATTERN)

RANDOM MODE
(RANDOM PATTERN)

COMPLEX EXERCISE MODE
(COMPLEX EXERCISE PATTERN)

STATIONARY MODE
(STATIONARY PATTERN)

FIG.4

SONG DATABASE

| ID | ARTIST NAME | SONG NAME | ALBUM NAME | TEMPO |
|---|---|---|---|---|
| 1 | SSS | K1 | K | 127 |
| 2 | SSS | K2 | K | 122 |
| 3 | SSS | L1 | L | 114 |
| 4 | TTT | M1 | M | 128 |
| 5 | TTT | M2 | M | 104 |
| 6 | UUU | N1 | N | 111 |
| ⋮ | ⋮ | ⋮ | ⋮ | ⋮ |

FIG.5A

EXTENDED PLAYLIST (FOR COMPLEX EXERCISE MODE)

| ID | TEMPO LIST |
|---|---|
| 11 | (0.5, 106, 1.0, 115) |
| 56 | (0.3, 115, 0.9, 120, 1.0, 125) |
| 57 | (1.0, 125) |
| 23 | (1.0, 125) |
| 7 | (0.5, 125, 0.9, 110) |
| 101 | (1.0, 110) |

FIG.5B

EXTENDED PLAYLIST (FOR HILL MODE)

| ID | TEMPO LIST |
|---|---|
| 10 | 0.0, 1.0, 125, 135 |
| 23 | 0.0, 0.5, 135, 145 |
| 51 | 0.4, 1.0, 145, 135 |
| 60 | 0.2, 0.7, 135, 125 |

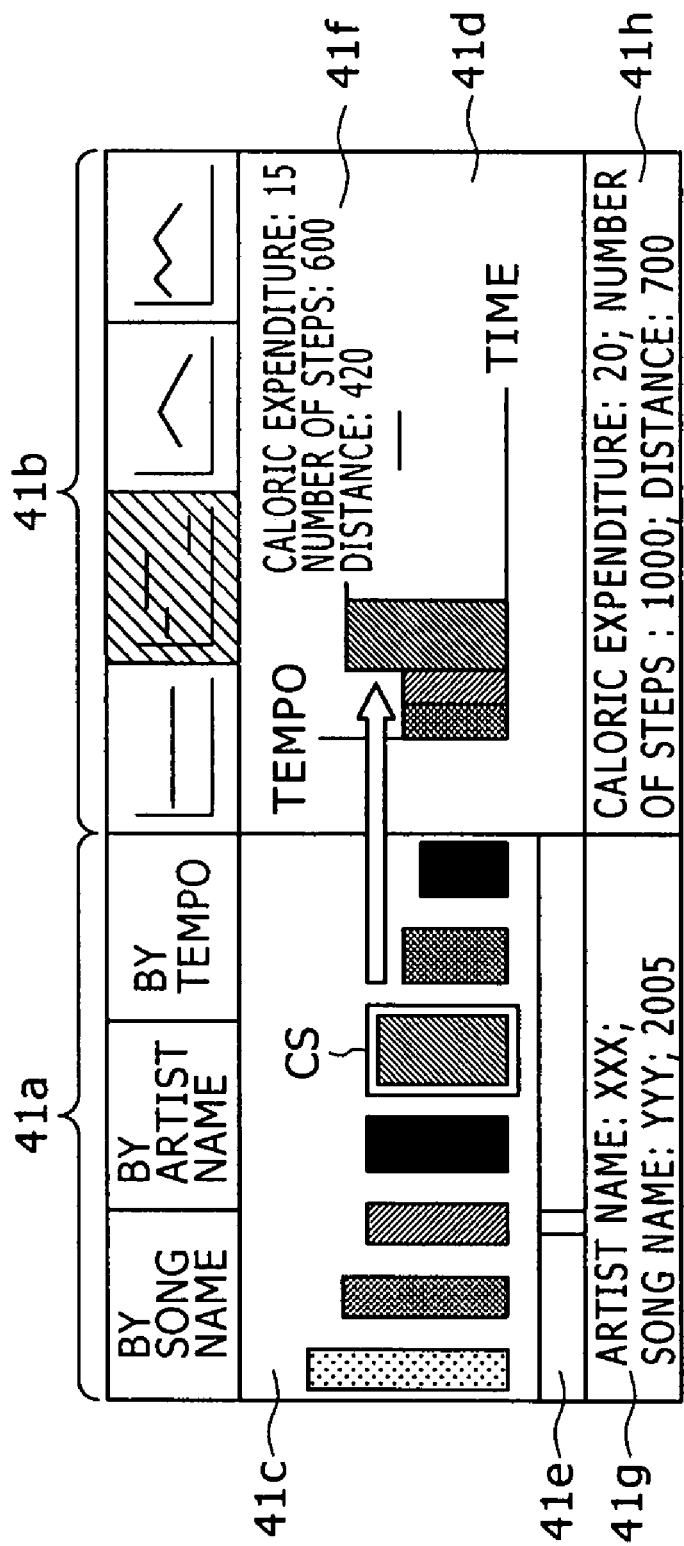

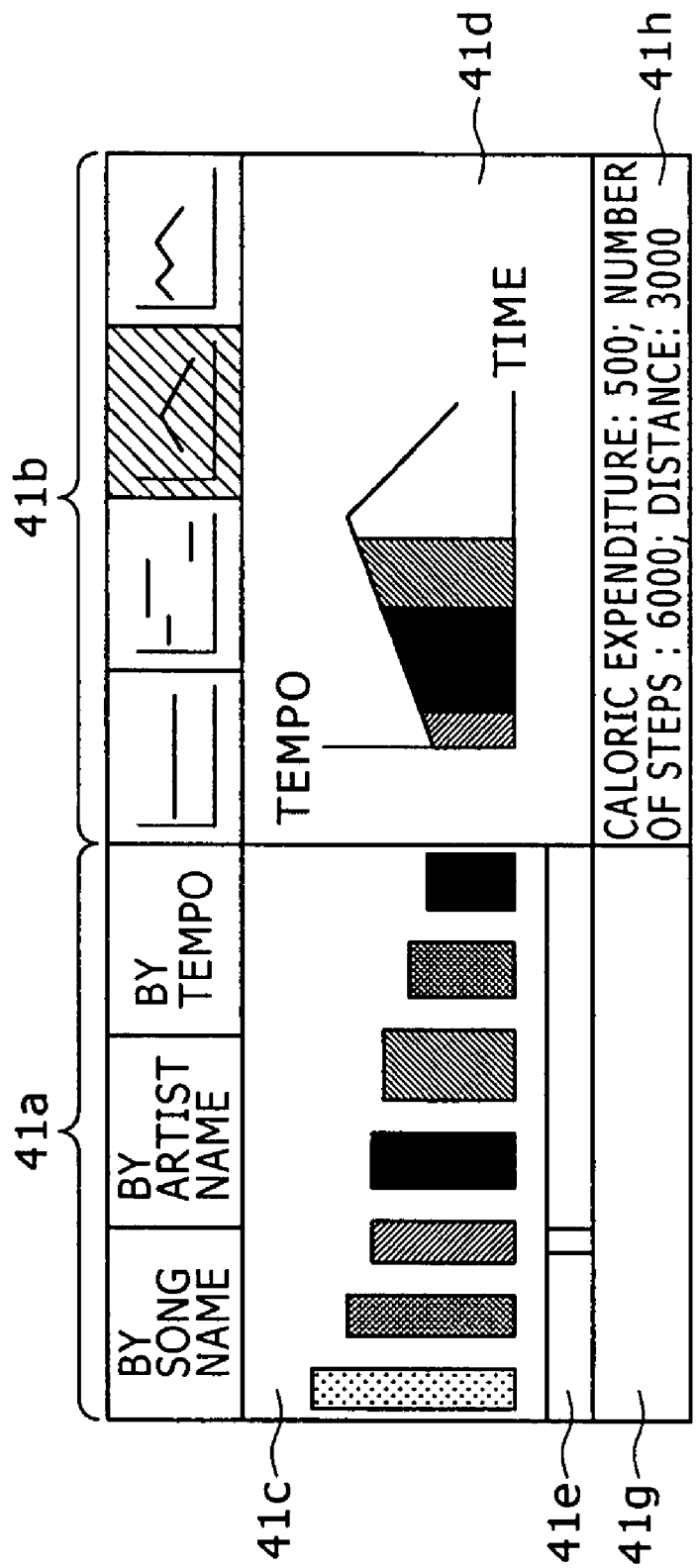

E: EXPENDED ENERGY (kcal/min); W: WEIGHT (kg);
V: WALKING VELOCITY (miles/h)

$E = W(0.03 + 0.0013V^2)$ ... (2)

E: EXPENDED ENERGY (kcal/min); W: WEIGHT (kg);
V: WALKING VELOCITY (km/h)

$E = 0.06yd$ ... (3)

V: WALKING VELOCITY (km/h); y: SONG TEMPO (BEATS/min);
d: STEP (m)

$C = Ex$ ... (4)

C: CALORIC EXPENDITURE (kcal);
E: EXPENDED ENERGY (kcal/min); x: SONG LENGTH (min)

SUBSTITUTE EQUATIONS (2) AND (3) INTO EQUATION (4).

$C = W(0.03 + 0.00000468y^2 d^2)x$ ... (5)

C: CALORIC EXPENDITURE (kcal); W: WEIGHT (kg);
y: SONG TEMPO (BEATS/min); d: STEP (m);
x: SONG LENGTH (min)

CONTENT REPRODUCTION LIST GENERATION DEVICE, CONTENT REPRODUCTION LIST GENERATION METHOD, AND PROGRAM-RECORDED RECORDING MEDIUM

CROSS REFERENCES TO RELATED APPLICATIONS

The present invention contains subject matter related to Japanese Patent Application JP 2007-011085 filed with the Japanese Patent Office on Jan. 22, 2007 and JP 2006-035044 filed Feb. 13, 2006, the entire contents of which being incorporated herein by reference.

BACKGROUND OF THE INVENTION

1. Field of the Invention

The present invention relates to a technology for generating song reproduction instruction information for use, for instance, in a device that is capable of reproducing audio.

2. Description of the Related Art

In recent years, small-size, lightweight, portable audio players have become widespread. Therefore, people can now listen to various songs (various types of music) in unprecedented situations. For example, many people carry a portable audio player and listen to music while walking outdoors or while jogging, walking, or playing any other sport for health maintenance, heath enhancement, or dieting purposes.

When the tempo of a reproduced song matches the tempo of user motion, the user realizes a sense of unity between motion (exercise) and song (music). For example, the user motion is walking, jogging, or other exercise. In this document, the tempo of walking, jogging, or other exercise or motion is hereinafter simply referred to as the exercise tempo. Even when the exercise tempo of the user suddenly changes or fails to match the tempo of a reproduced song, a certain device such as detecting the user's exercise tempo and changing the tempo of the reproduced song in accordance with the exercise tempo has been devised to provide.

In this document, the terms "song (music) tempo," "song (music) reproduction tempo," and "song tempo" refer to a speed at which music data is reproduced and, more specifically, refer to the number of beats per minute (BPM). To be more precise, the user's exercise tempo is a motion (exercise) speed. If, for instance, the user's motion (exercise) is walking or running, the exercise tempo refers to the number of steps per minute. If the user's motion is jumping, the exercise tempo refers to the number of jumps per minute. In any case, the exercise tempo refers to the number of countable minimum motion units per minute.

A device disclosed by Japanese Patent Laid-open No. 2005-156641 (hereinafter referred to as Patent Document 1) uses a detector, which is attached to the user's body, to determine the pace of walking or other exercise from vibration that accompanies a motion (exercise) or step data about walking, and changes the song reproduction tempo in accordance with changes in the pace. The use of this device makes it possible to do a continuous exercise comfortably or do an exercise efficiently to reproduced songs.

SUMMARY OF THE INVENTION

However, even when the technology disclosed by Patent Document 1 is used to change the song reproduction tempo in accordance with the user's exercise tempo, some songs readily accept reproduction tempo changes while others do not. If, for instance, the reproduction tempo of a song that is reproduced at a slow tempo under normal conditions is increased to match the user's exercise tempo, a sense of discomfort may be invoked. On the contrary, if the reproduction tempo of a song that is reproduced at a fast tempo under normal conditions is decreased to match the user's exercise tempo, a sense of sluggish movement may be invoked.

Under the above circumstances, a solution would be to collect fixed-tempo songs for fitness exercises and change the reproduction tempo of the collected songs in accordance with the exercise tempo. This makes it possible to avoid a sense of discomfort. However, favorite songs vary from one person to another. When an attempt is made to collect fixed-tempo songs whose reproduction tempo can be readily changed, personally owned favorite songs, which are reproduced at various tempos, may not be fully utilized.

Contrary to the idea of changing the song reproduction tempo in accordance with the user's exercise tempo, the user who does an exercise might want to reproduce various songs, which vary in reproduction tempo, in order to ensure that a predetermined exercise load is imposed to produce intended exercise effects. For example, the user might want to do an exercise in accordance with a predetermined load pattern. More specifically, the user might want to begin an exercise at a slow exercise tempo and then gradually raise the exercise tempo to increase the exercise load. Further, after a predetermined exercise tempo is reached, the user might want to gradually lower the exercise tempo. It is preferred that the user be allowed to reproduce favorite songs in the above situation.

Under the above circumstances, the present invention enables the user to intuitively and easily generate song reproduction instruction information for changing the song reproduction tempo in a desired pattern.

According to an embodiment of the present invention, there is provided a content reproduction list generation device including an operation section, a storage section, and a reproduction list generation section. The storage section is configured to store a change pattern that indicates how the reproduction tempo changes when content is reproduced. The reproduction list generation section is configured to select a change pattern in accordance with an input from the operation section, associate content with the selected change pattern, and generate a content reproduction list for informing a reproduction section of the reproduction order and reproduction tempo of content to be reproduced in accordance with the selected change pattern and the associated content.

The content reproduction list generation device according to an embodiment of the present invention selects a content reproduction tempo change pattern in accordance with an user input that is received through the operation section, and associates content with the content reproduction tempo change pattern. In accordance with the content reproduction tempo change pattern and the content associated with the content reproduction tempo change pattern, the reproduction list generation section generates a reproduction list for informing the reproduction section of the reproduction order and reproduction tempo of the content to be reproduced.

The above makes it possible to select the songs to be reproduced in accordance with a song reproduction tempo change pattern, that is, a load pattern for an intended exercise, adjust the reproduction tempos of selected songs in accordance with the selected reproduction tempo change pattern, and intuitively and easily generate a song reproduction list, which indicates the reproduction order and reproduction tempos of the selected songs.

When songs are reproduced in accordance with the generated song reproduction list, the selected songs are reproduced in the selected order while the reproduction tempo is adjusted in accordance with the selected reproduction tempo change pattern. Therefore, the user can be guided to do an exercise in accordance with the desired load pattern (reproduction tempo change pattern).

The present invention makes it possible to intuitively and easily generate the song reproduction list for reproducing one or more user-selected songs while changing the reproduction tempo in accordance with the user-selected reproduction tempo change pattern. Further, when the songs are reproduced in accordance with the generated song reproduction list, the user can be guided to do an exercise in accordance with the load pattern (reproduction tempo change pattern) desired by the user.

BRIEF DESCRIPTION OF THE DRAWINGS

FIG. 4 illustrates the contents of a song database;

FIGS. 5A and 5B show examples of extended playlists;

FIG. 8 shows another example of a tempo curve input screen;

FIG. 9 shows still another example of a tempo curve input screen; and

FIG. 10 shows how caloric expenditure is calculated.

DETAILED DESCRIPTION OF THE PREFERRED EMBODIMENTS

A device, method, and program according to embodiments of the present invention will now be described with reference to the accompanying drawings. The present invention is characterized by a method of creating a song reproduction list and applicable to various information processing devices that are capable of creating a playlist. To clearly describe the use of a created playlist, however, the following description of an embodiment of the present invention assumes that the present invention is applied to an audio player.

The audio player to which the present invention is applied may be a portable audio player that is carried by a user who does an exercise, a fitness apparatus having a music reproduction function for use at a fitness club or the like, or an AV (Audio/Visual) apparatus that is installed and used, for instance, at home. In other words, the present invention can be applied to various audio players no matter whether they are portable or installed for use. For the sake of clear, simple explanation, however, the following description of an embodiment of the present invention assumes that the present invention is applied to a portable audio player that has a relatively large display screen and incorporates au audio reproduction function, information input function, and information storage function.

[Audio player]

Figure 1:
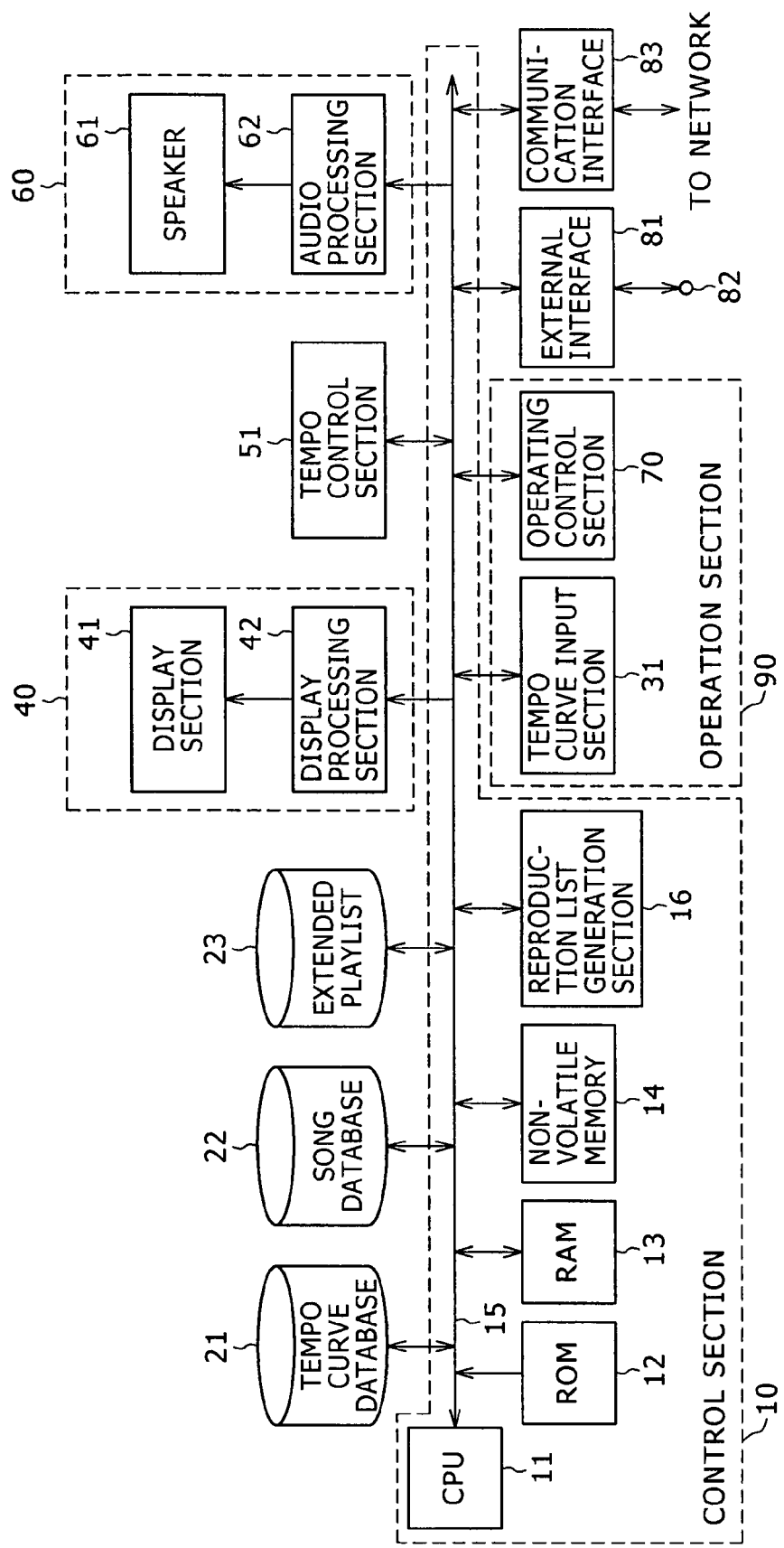
FIG. 1 is a block diagram illustrating an audio player according to an embodiment of the present invention.

FIG. 1 is a block diagram illustrating an audio player according to an embodiment of the present invention. The device, method, and program according to an embodiment of the present invention are applied to the audio player shown in FIG. 1. As shown in FIG. 1, the audio player according to the present embodiment includes a control section 10, a tempo curve database 21, a song database 22, an extended playlist storage section 23, a tempo curve input section 31, a display device section 40, a tempo control section 51, an audio output device section 60, an operating control section 70, an external interface 81, an input/output terminal 82, and a communication interface 83. The tempo curve input section 31 and operating control section 70 constitute an operation section 90.

As shown in FIG. 1, the control section 10 is a microcomputer that includes a central processing unit (CPU) 11, a read-only memory (ROM) 12, a random access memory (RAM) 13, a nonvolatile memory 14, and a reproduction list generation section 16. These components are interconnected through a CPU bus 15. The control section 10 controls various sections of the audio player according to the present embodiment.

The CPU 11 serves as a main control unit. For example, the CPU 11 reads and executes programs that are stored in the ROM 12 or nonvolatile memory 14. The CPU 11 performs such processes to form control signals that are to be supplied to various sections. The CPU 11 supplies the control signals to the associated sections to control them, and allows various sections to perform target processes. The CPU 11 also receives data from various sections, processes the received data, and records the processed data on a recording medium.

The ROM 12 stores programs to be executed by the CPU 11 and various data demanded for processing. The RAM 13 is mainly used as a work area, which, for instance, temporarily stores interim processing results. The nonvolatile memory 14 is an electrically erasable and programmable ROM (EEPROM), flash memory, or the like. The nonvolatile memory 14 stores various setup parameters, processing programs, processing results, and various other data that should be retained even after power off. The reproduction list generation section 16 generates a content reproduction list in accordance with an input to the operation section 90. The reproduction list generation section 16 will be described in detail later.

The tempo curve database 21, song database 22, and extended playlist storage section 23 are recording medium drives, which have a relatively large storage capacity and a recording medium that is capable of storing various information. For example, these drives permit the use of a hard disk, recordable digital versatile disc (DVD) or other optical disc, Mini Disc (MD) (registered trademark) or other magnetooptical disc, semiconductor memory, and IC card memory. However, the present embodiment assumes that the tempo curve database 21, song database 22, and extended playlist storage section 23 are hard disk drives that use a hard disk as a recording medium.

For the sake of brevity, the present embodiment assumes that the tempo curve database 21, song database 22, and extended playlist storage section 23 are formed on separate hard disks as indicated in FIG. 1. However, the hard disks are increasing their storage capacity year after year while reducing their physical size. Therefore, a plurality of databases and information storage sections of the tempo curve database 21, song database 22, and extended playlist storage section 23 may be formed on a single hard disk.

In the present embodiment, the tempo curve database 21 stores reproduction tempo change patterns. The reproduction tempo change patterns are exercise load patterns for the user and used to indicate tempo changes in songs to be reproduced. The reproduction tempo change patterns are expressed by tempo curves, which are straight or curved lines that are obtained when time is plotted along the horizontal axis while the tempo is plotted along the vertical axis. The temp curve database 21 stores a plurality of tempo curves that correspond to a plurality of reproduction tempo change patterns. The tempo curve database 21 will be described in detail later.

The song database 22 stores song data or music data that can be reproduced by the audio player according to the present embodiment. Information about reproduction tempo, reproduction time, and the like is attached to the song data in the song database 22 as meta data, as described in detail later. The extended playlist storage section 23 stores an extended playlist (song reproduction list) that the reproduction list generation section 16 formulates by adjusting the reproduction tempo in accordance with a user-selected tempo curve and one or more songs selected in association with the user-selected tempo curve.

As described above, the tempo curve database 21, song database 22, and extended playlist storage section 23 store individually song data and various information demanded for song reproduction.

The tempo curve input section 31 receives various information demanded for extended playlist creation and supplies the received information to the control section 10 and reproduction list generation section 16. The various information for extended playlist creation includes, for instance, a selected input of a tempo curve and a selected input of songs that are associated with the selected tempo curve. The tempo curve input section 31 includes a pointing device such as a mouse, trackball, or trackpad, and if necessary, arrow keys, Enter key, and other operating control keys as well.

The display device section 40 includes a display section 41 and a display processing section 42, as shown in FIG. 1. The display processing section 42 receives various video data from the control section 10, converts the received video data to an analog video signal, and supplies the analog video signal to the display section 41. If compressed video data is supplied to the display processing section 42, the display processing section 42 performs a decoding process on the compressed video data.

The display section 41 is a liquid crystal display (LCD), organic electro luminescence display, cathode-ray tube (CRT), or other display device having a relatively large display screen. The display screen on the display section 41 in the display device section 40 can display, for instance, various guidance information, message information, and video content under the control of the control section 10.

When, for instance, songs are to be reproduced in accordance with an extended playlist stored in the extended playlist storage section 23, the tempo control section 51 accesses the song database 22, reads the song data to be reproduced, supplies the read song data to the audio output device section 60, and issues a song data reproduction tempo instruction to the audio output device section 60 in accordance with the extended playlist.

The audio output device section 60 includes a speaker 61 and an audio processing section 62. The audio processing section 62 receives, for instance, song data and other audio data and control information specifying the reproduction tempo through the tempo control section 51 and control section 10. The audio output device section 60 generates an analog audio signal that is formatted for supply to the speaker 61 in accordance, for instance, with the supplied song data and other audio data and control information specifying the reproduction tempo, and supplies the analog audio signal to the speaker 61. The speaker 61 then emits a sound in accordance with the analog audio signal received from the audio processing section 62. If compressed audio data is supplied to the audio processing section 62, the audio processing section 62 also performs a decoding process on the compressed audio data.

The above description assumes that the audio output device section 60 has the speaker 61. However, the present invention is not limited to the use of such a configuration. As regards the audio player according to the present embodiment, a headphone can be connected to the audio processing section 62 instead of the speaker 61. When a headphone is connected to the audio processing section 62, the user can listen to a sound that is reproduced via the headphone.

The operating control section 70 includes a reproduction key, stop key, fast-forward key, rewind key, pause key, numeric keys, arrow keys, function keys, and other operating control keys demanded for the use of songs. The operating control section 70 receives various user inputs, converts the received inputs to electrical signals, and supplies such electrical signals to the control section 10. The control section 10 can control various sections in accordance with user inputs from the operating control section 70 to perform user-specified processes.

The external interface 81 and external input/output terminal 82 are used to connect various external apparatus to the audio player according to the present embodiment. The audio player according to the present embodiment can receive song data from an external apparatus that is connected via the external input/output terminal 82, and supply local song data to an external apparatus for backup and other purposes.

The communication interface 83 is used to connect the audio player according to the present embodiment to a network such as the Internet for communication purposes. For example, the audio player according to the present embodiment can be connected to the Internet or other network through the communication interface 83 to download target song data from a server or acquire meta data about song data.

The audio player according to the present embodiment uses the song database 22 to store song data that is supplied from a personal computer or other external apparatus through the external input/output terminal 82 and external interface 81 and song data that is supplied from a server on the Internet or other network via the communication interface 83.

The user can perform a predetermined procedure through the operating control section 70 to read and reproduce target song data that is included in the song data stored in the song database 22. In accordance with the predetermined procedure that is performed by the user through the operating control section 70, the control section 10 displays a list of song data stored in the song database 22 on the display screen of the display section 41 in the display device section 40. The user selects the target song data from the displayed song data list through the operating control section 70.

The control section 10 reads the selected song data from the song database 22 and supplies it to the audio output device section 60. In the audio output device section 60, the audio processing section 62 receives the supplied song data, formulates the analog audio signal to be supplied to the speaker 61, and supplies the formulated analog audio signal to the speaker 61. The speaker 61 then emits a sound that corresponds to the target song data. It means that the user-selected song data is reproduced.

Further, the audio player according to the present embodiment can create a playlist and reproduce song data in accordance with the created playlist. The audio player according to the present embodiment can create not only a playlist that enables the user to reproduce favorite songs in a desired order, but also an extended playlist that contains the information for changing the reproduction tempos of songs to be reproduced for the purpose of allowing the user to do an exercise that imposes a target load.

The user may walk, jog, or do some other exercise while listening to reproduced songs. The user's exercise may be guided when the user does an exercise at an exercise tempo that matches the reproduction tempo of reproduced songs. Consequently, the user may be able to do an exercise smoothly.

A certain user might want to do an exercise in a target load pattern. For example, the user might want to begin an exercise at a slow exercise tempo, and then gradually raise the exercise tempo to a predetermined value. Further, after the predetermined exercise tempo is reached, the user might want to gradually lower the exercise tempo. In some other cases, the user might want to do an exercise for a predetermined period of time at a predetermined exercise tempo (warm-up), then do an exercise for a predetermined period of time at a relatively fast exercise tempo (training), and do an exercise for a predetermined period of time at a relatively slow exercise tempo (cool-down).

The audio player according to the present embodiment prepares a plurality of selectable load patterns to permit the user to select a target load pattern. The user-selected load pattern is a reproduction tempo change pattern that indicates changes in the tempo of reproduced songs. When the songs to be reproduced in accordance with the reproduction tempo change pattern are selected, the audio player specifies the songs to be reproduced and the reproduction order of such songs, and creates an extended playlist in which the reproduction tempo and reproduction time of each selected song are adjusted in accordance with the reproduction tempo change pattern (exercise load pattern).

When the user does an exercise in such a manner that the exercise tempo matches the reproduction tempo of songs reproduced in accordance with the extended playlist, the user can walk, jog, and perform various other exercises so that the user is loaded in accordance with the target load pattern.

[Overview of Major Schemes of the Audio Player According to an Embodiment of the Present Invention]

Figure 2:
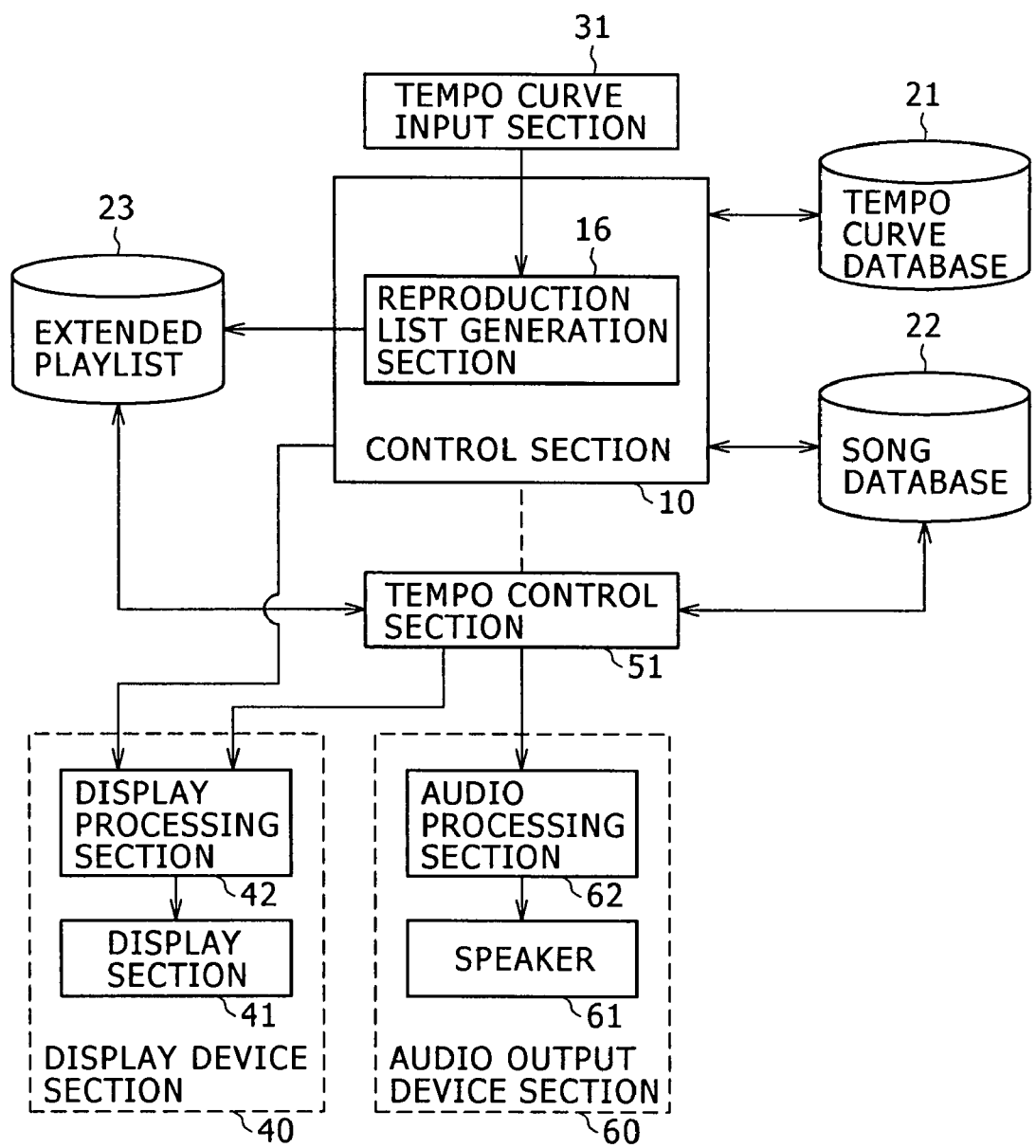
FIG. 2 is a functional block diagram illustrating major functions of the audio player according to the embodiment shown in FIG. 1.

Major schemes according to an embodiment of the present invention will now be described with reference to FIG. 2. The major schemes are a scheme for creating the extended playlist and a scheme for reproducing songs in accordance with the extended playlist. FIG. 2 is a block diagram that outlines the major schemes of the audio player according to the present embodiment, which is shown in FIG. 1.

As shown in FIG. 1, the audio player according to the present embodiment includes the reproduction list generation section 16, tempo curve database 21, song database 22, extended playlist storage section 23, tempo curve input section 31, and display device section 40, which is composed of the display section 41 and display processing section 42, as a scheme for creating the extended playlist. As a scheme for reproducing songs in accordance with the created extended playlist, the audio player according to the present embodiment includes the song database 22, extended playlist storage section 23, tempo control section 51, and audio output device section 60, which serves as a song reproduction section and includes the speaker 61 and audio processing section 62.

A tempo curve is an exercise load pattern for the user and a reproduction tempo change pattern that indicates tempo changes in songs to be reproduced. The tempo curve is a straight or curved line that is obtained by plotting time along the horizontal axis and tempo along the vertical axis to indicate an exercise load pattern or reproduction tempo change pattern. The tempo curve database 21 stores a plurality of tempo curves that correspond to a plurality of reproduction tempo change patterns.

FIGS. 3A to 3D show examples of tempo curves that are stored in the tempo curve database 21. As described above, the tempo curves are exercise load patterns for the user who does an exercise and reproduction tempo change patterns for the songs to be reproduced. Various exercise modes are available so that an exercise can be performed in accordance with various load patterns. Further, various reproduction modes are available so that songs can be reproduced in accordance with various reproduction tempo change patterns.

Figure 3A:
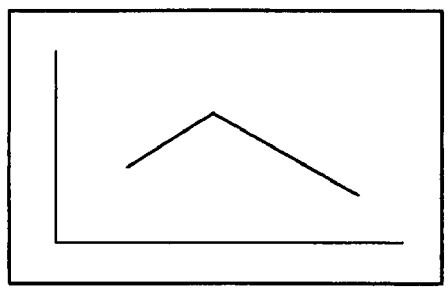
FIGS. 3A to 3D show examples of tempo curves that are stored in a tempo curve database.
Figure 3B:
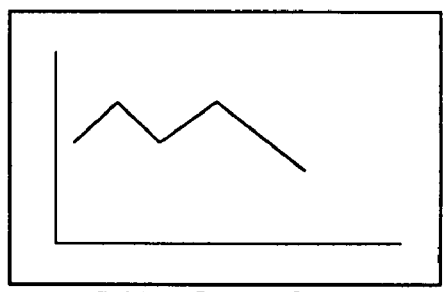
Figure 3C:
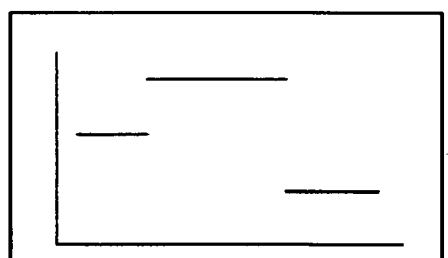
Figure 3D:
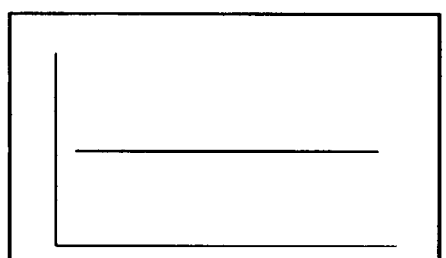

Typical tempo curves represent, for instance, a hill mode in FIG. 3A, a random mode in FIG. 3B, a complex exercise mode in FIG. 3C, and a stationary mode in FIG. 3D.

The hill mode is for doing an exercise and reproducing songs in a hill pattern. As shown in FIG. 3A, the hill mode increases the tempo gradually with time. After a predetermined tempo value is reached, however, this mode gradually decreases the tempo. The random mode is for doing an exercise and reproducing songs in a random pattern. As shown in FIG. 3B, the random mode changes the tempo randomly with time.

The complex exercise mode is for doing an exercise and reproducing songs in a complex exercise pattern. As shown in FIG. 3C, the complex exercise mode maintains a relatively slow tempo for a predetermined period of time, then maintains a fast tempo for a predetermined period of time, and finally maintains a slow tempo for a predetermined period of time with time. In other words, the complex exercise mode varies the tempo so that the user can perform an exercise while the load is varied. The stationary mode is for doing an exercise and reproducing songs in a stationary pattern. As shown in FIG. 3D, the stationary mode maintains a fixed tempo at all times.

As indicated in FIGS. 3A to 3D, various tempo curves, which are formulated by plotting time along the horizontal axis and tempo along the vertical axis, are stored in the tempo curve database 21.

The song database 22 stores song data (music data) that can be reproduced by the audio player according to the present embodiment, as described earlier. FIG. 4 illustrates the contents of the song database 22 in the audio player according to the present embodiment.

As shown in FIG. 4, the song database 22 is organized so that a song ID, which is song identification information, an artist name, a song name, an album name, and a reproduction tempo are associated with each song entry in the database. More specifically, a song having a song ID of "1" has an artist name of "SSS," a song name of "K1," an album name of "K," and a tempo of "127." As described above, the song database 22 stores a song ID, an artist name, a song name, an album name, and a tempo of each song that can be reproduced by the audio player according to the present embodiment. The song database 22 also stores actual data for song data that is identified by a song ID.

As shown in FIG. 2, the user selects a tempo curve through the tempo curve input section 31 and selects the songs to be reproduced in association with the selected tempo curve. The reproduction list generation section 16 then generates an extended playlist from the selected tempo curve and one or more songs, and stores the generated extended playlist in the extended playlist storage section 23.

FIGS. 5A and 5B show examples of extended playlists. As shown in FIGS. 5A and 5B, each extended playlist is composed of a song ID field and a tempo list field. In FIGS. 5A and 5B, a number in the song ID field is a song ID that identifies the song to be reproduced. When a number in the tempo list field is not greater than 1.0, it indicates a proportion in a song. When, for instance, the number is 0.5, it represents a 50% portion of a song. Further, when the number is greater than 1.0, it indicates a tempo.

FIG. 5A shows an example of an extended playlist that is generated when the complex exercise mode is selected as a tempo curve and songs are selected for use in the complex exercise mode. When the extended playlist shown in FIG. 5A is used, the audio output device section 60 first reproduces the song data having a song ID of "11." The audio output device section 60 reproduces this song data at a reproduction tempo of "106" from the beginning to a 0.5 position, that is, during the first 50% portion, and at a reproduction tempo of "115" from the 0.5 position to a 1.0 position, that is, from the 0.5 position to the end.

Next, the audio output device section 60 reproduces the song data having a song ID of "56." The audio output device section 60 reproduces this song data at a reproduction tempo of "115" from the beginning to a 0.3 position, at a reproduction tempo of "120" from the 0.3 position to a 0.9 position, and at a reproduction tempo of "125" from the 0.9 position to the end.

The audio output device section 60 then sequentially reproduces the song data having a song ID of "57" and the song data having a song ID of "23" at a reproduction tempo of "125" from the beginning to the end. Subsequently, the audio output device section 60 reproduces the song data having a song ID of "7" at a reproduction tempo of "125" from the beginning to a 0.5 position and at a reproduction tempo of "110" from the 0.5 position to a 0.9 position. Finally, the audio output device section 60 reproduces the song data having a song ID of "101" at a reproduction tempo of "110" from the beginning to the end.

As described above, when the extended playlist shown in FIG. 5A is used, the songs selected and associated with the complex exercise mode can be reproduced while the reproduction tempo is changed in accordance with the complex exercise mode.

FIG. 5B shows an example of an extended playlist that is generated by the reproduction list generation section 16 when the hill mode is selected as a tempo curve and songs are selected for use in the hill mode. When the extended playlist shown in FIG. 5B is used, the audio output device section 60 first reproduces the song data having a song ID of "10" from a 0.0 position to a 1.0 position, that is, from the beginning to the end, while gradually increasing the reproduction tempo from "125" to "135." Next, the audio output device section 60 reproduces the song data having a song ID of "23" from the beginning to a 0.5 position while gradually increasing the reproduction tempo from "135" to "145."

Subsequently, the song reproduction section reproduces the song data having a song ID of "51" from a 0.4 position to a 1.0 position while gradually decreasing the reproduction tempo from "145" to "135." Finally, the song reproduction section reproduces the song data having a song ID of "60" from a 0.2 position to a 0.7 position while gradually decreasing the reproduction tempo from "135" to "125."

As described above, when the extended playlist shown in FIG. 5B is used, the audio output device section 60 can reproduce the songs selected and associated with the hill mode while changing the reproduction tempo in accordance with the hill mode. As indicated in FIG. 5B, the reproduction list generation section 16 can create an extended playlist that reproduces a target song from the beginning to the end while changing the reproduction tempo over a predetermined range and create an extended playlist that reproduces a particular portion of a target song (e.g., the first 50% portion, a 60% portion following the first 40% portion, or a 50% portion following the first 20% portion) while changing the reproduction tempo. This matter will be described again later.

When an extended playlist stored in the extended playlist storage section 23 is actually used to reproduce song data, the tempo control section 51 functions so that the audio output device section 60 can reproduce target song data while varying its reproduction tempo.

More specifically, the tempo control section 51 references a target extended playlist, which is stored in the extended playlist storage section 23, reads song data from the song database 22 in the order specified by the referenced extended playlist, and supplies the read song data and the information in the tempo list field of the referenced extended playlist to the audio output device section 60. The audio output device section 60 then reproduces the song data according to the extended playlist while controlling the reproduction tempo and reproduction time.

The user can change tempo curve parameters through the tempo curve input section 31 in addition to making tempo curve and song selections. More specifically, when the user selects a tempo curve pattern from the tempo curve database 21, changes tempo curve parameters, selects songs from the song database 22, and applies the selected songs to a tempo curve, the reproduction list generation section 16 creates an extended playlist that includes a song list and the information about the reproduction tempo of each song listing. Although a normal playlist merely indicates an order in which songs are to be reproduced, the extended playlist includes a reproduction tempo list as shown in FIGS. 5A and 5B.

The tempo control section 51 executes the extended playlist, which is created by the reproduction list generation section 16 in accordance with the information input through the tempo curve input section 31, to convey the songs and reproduction tempo to the audio output device section 60, which serves as a song reproduction section. The audio output device section 60 receives song data and reproduction tempo from the tempo control section 51 and the original tempo, which is obtained as the meta data about the associated songs, and reproduces the songs at a speed of "reproduction tempo/original tempo."

[Process Performed to Create an Extended Playlist]

The process that the audio player according to the present embodiment performs to create an extended playlist will now be described with reference to a flowchart in FIG. 6 and examples of display screens shown in FIGS. 7 to 9.

Figure 6:
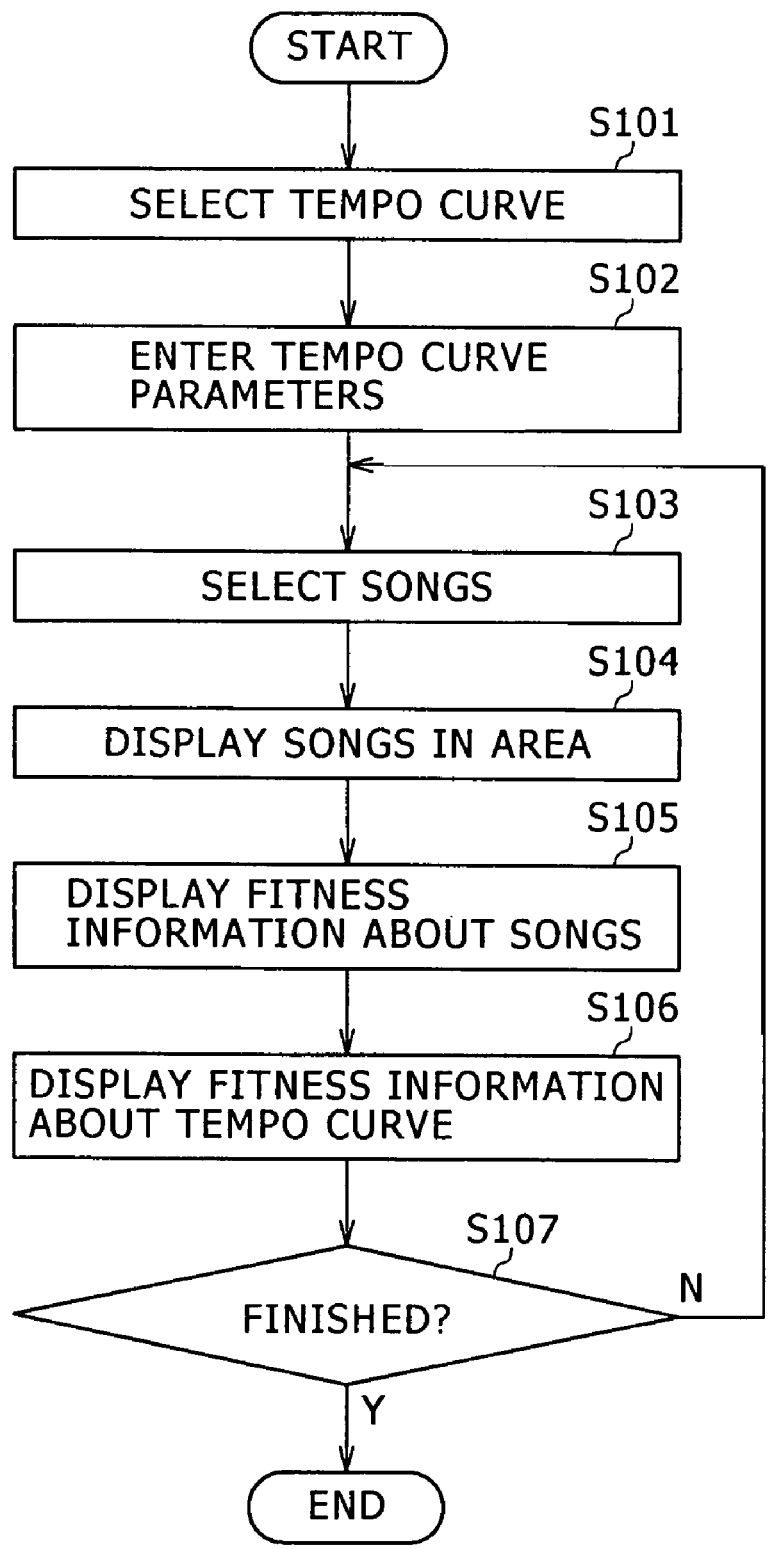
FIG. 6 is a flowchart illustrating a process that is performed to create an extended playlist.

FIG. 6 is a flowchart illustrating an extended playlist creation process that is performed by the audio player according to the present embodiment. The process shown in FIG. 6 is mainly performed by the control section 10 and particularly by the reproduction list generation section 16 when an instruction for creating an extended playlist is input and received through the tempo curve input section 31.

Figure 7:
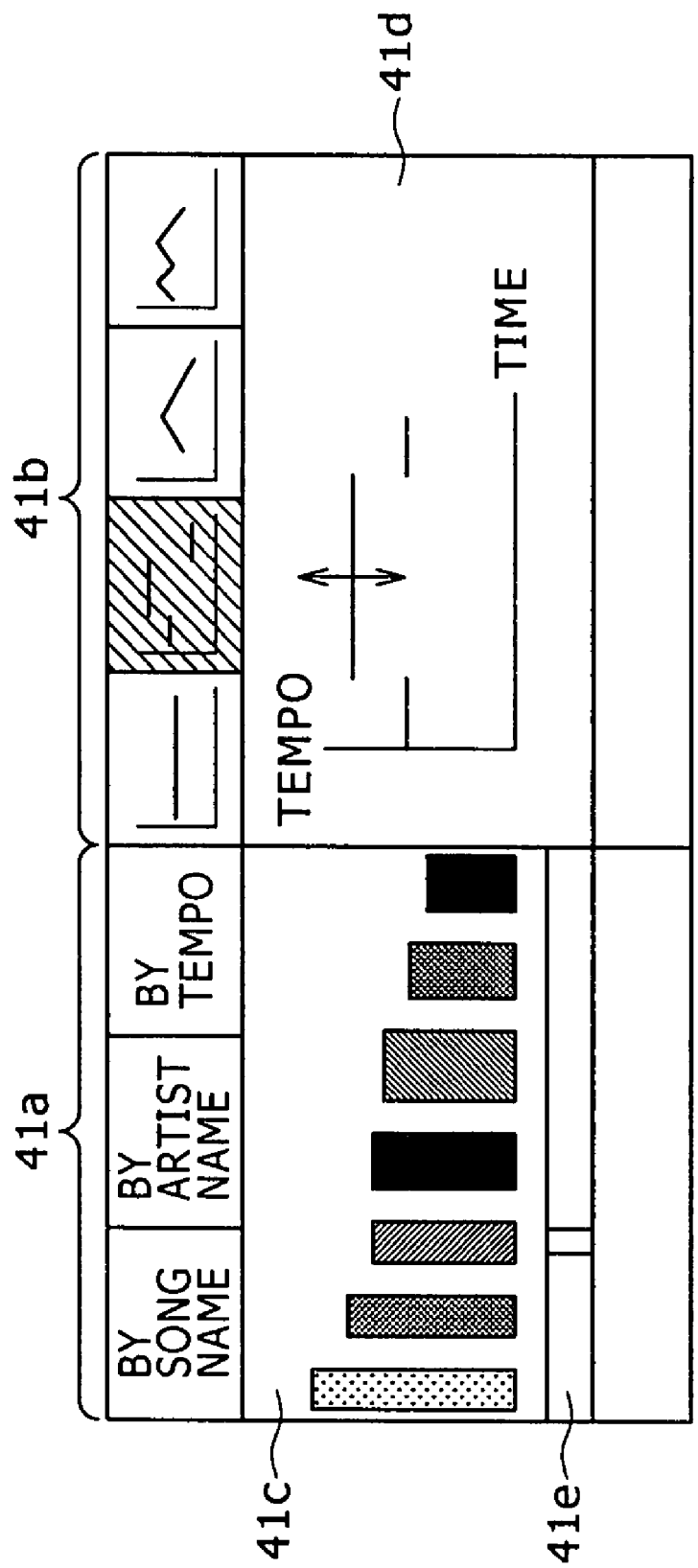
FIG. 7 shows an example of a tempo curve input screen.

Upon receipt of an input instruction for creating an extended playlist, the reproduction list generation section 16 first performs step S101 to supply necessary display information to the display device section 40, display a tempo curve input screen on the display screen of the display section 41 as indicated in FIG. 7, and receive a selected input of a target tempo curve.

The tempo curve input screen, which is shown in FIG. 7, has a sort order selection area 41a for a song list and a tempo curve selection area 41b. The sort order selection area 41a is an uppermost area that is positioned on the left-hand side. The tempo curve selection area 41b is an uppermost area that is positioned on the right-hand side. A song list display area 41c is positioned below the sort order selection area 41a. A selected tempo curve display area 41d is positioned below the tempo curve selection area 41b. A slider 41e for scrolling through the song list is positioned below the song list display area 41c.

In step S101, the user selects a target mode from the stationary mode, complex exercise mode, hill mode, and random mode, which are sequentially arranged, from left to right, in the tempo curve selection area 41b, and when the user-selected mode is input, it is received by the tempo curve input section 31. FIG. 7 shows a case where the complex exercise mode, which is displayed in the second position from the left, is selected from the tempo curve selection area 41b.

In the above instance, the reproduction list generation section 16 performs step S102 to control the display device 40, display a basic pattern of the selected tempo curve in the selected tempo curve display area 41d of the display screen on the display section 41, and receive an input of parameter changes to be applied to the selected tempo curve. In step S102, the parameters for the selected tempo curve can be changed through the tempo curve input section 31 by changing the displayed basic pattern of the selected tempo curve as indicated by two arrows shown in the selected tempo curve display area 41d, which is shown in FIG. 7. The user can change the parameters for the selected tempo curve, for instance, to adjust the tempo to change the exercise load or adjust the time during which a fixed tempo persists.

In step S103, which is performed after completion of step S102, target songs are selected from the song list, which is displayed in the song list display area on the left-hand side, entered, and accepted through the tempo curve input section 31. In step S103, which is performed for song selection purposes, the reproduction list generation section 16 can sort song listings by song name, artist name, or tempo when "By song name," "By artist name," or "By tempo" is selected from the sort order selection area 41a, which is a left-hand uppermost area. Further, the user can operate the slider 41e to quickly locate and select target songs.

In the tempo curve input screens shown in FIGS. 7 to 9, the display section 41 displays the songs to be displayed in the song list display area 41c and sorts them by tempo. Further, the display section 41 displays rectangles to indicate the reproduction time and average tempo of each song (the horizontal axis and vertical axis indicate the reproduction time and average tempo, respectively). This enables the user to visually confirm the reproduction time and average tempo of each song and properly select songs that match the selected tempo curve.

When, in step S103, the user positions a cursor CS over the rectangle for a target song in the song list displayed in the song list display area 41c through the tempo curve input section 31 as shown in FIG. 8, the control section 10 acquires detailed information about the target song from the song database 22, and displays the acquired information in a song information display area 41g, which is a left-hand lowermost area of the input screen. FIG. 8 shows a case where an artist name of "XXX," a song name of "YYY," and a release year of "2005" are displayed in the song information display area 41g as the detailed information.

When, in step S104, the user specifies a move destination on the tempo curve displayed in the selected tempo curve display area 41d, through the tempo curve input section 31, for the song selected by placing the cursor CS over it, the selected tempo curve display area 41d displays a rectangle for the song in accordance with the tempo curve. In this instance, the product of the song reproduction time and average tempo represents the number of steps for the entire song. Therefore, if the move destination on the tempo curve represents a tempo that differs from the average tempo of the song, the area of the rectangle at the move destination is made equal to that of the original rectangle. It is necessary to simply fill the area of the tempo curve with the areas of songs. Therefore, appropriate songs can be intuitively selected. In this manner, songs are completely selected and input in accordance with the tempo curve.

More specifically, the user can select a target song and associate it with a tempo curve by placing the cursor CS over a rectangle representing the target song to select it and dragging and dropping it at a predetermined position that is associated with the tempo curve. Alternatively, the user can select a target song and associate it with a tempo curve by placing the cursor CS over a rectangle representing the target song to select it and selecting an association position on the tempo curve. The selected tempo curve display area 41d then displays a rectangle representing the selected song in association with the tempo curve as indicated by a large arrow that is shown at the center of FIG. 8.

In step S105, the control section 10 displays fitness information about the song that is selected and associated with the tempo curve. For example, the fitness information about the song is presented by a display of fitness information about a song 41f in the selected tempo curve display area 41d. The caloric expenditure, the total number of steps, and the distance moved are calculated by the control section 10 to obtain the fitness information about the song on the assumption that the user does an exercise to the selected song that is reproduced in a reproduction tempo corresponding to the tempo curve. The results of calculations are then supplied to the display device section 40 and displayed as the fitness information about the song.

In the example shown in FIG. 8, the fitness information (exercise amount information) about the third song selected in association with the tempo curve indicates that the caloric expenditure is 15 kcal (kilocalories), and that the number of steps is 600, and further that the distance is 420 m (meters). This enables the user to obtain the fitness information (exercise amount information) about an exercise that the user does to the selected song.

In step S106, the reproduction list generation section 16 displays fitness information about an exercise that is performed in accordance with the selected tempo curve. The fitness information about the tempo curve is displayed as a display of fitness information about a tempo curve 41h in an area below the selected tempo curve display area 41d, which is shown in FIG. 8. The caloric expenditure, the total number of steps, and the distance moved are calculated by the control section 10 to obtain the fitness information about the tempo curve on the assumption that the user does an exercise to all the selected songs that are reproduced in a reproduction tempo corresponding to the tempo curve. The results of calculations are then supplied to the display device section 40 and displayed as the fitness information about the tempo curve.

In the example shown in FIG. 8, the fitness information about the tempo curve indicates that the caloric expenditure is 20 kcal (kilocalories), and that the number of steps is 1000, and further that the distance is 700 m (meters). This enables the user to obtain the total exercise amount information (caloric expenditure, number of steps, and distance) about an exercise that the user does to one or more songs that are selected in association with the selected tempo curve and sequentially reproduced.

In step S107, the reproduction list generation section 16 decides whether, for instance, a finishing procedure is performed by the user and received through the tempo curve input section 31. If the judgment result obtained in step S107 indicates that a finishing procedure is not received yet, steps S103 and beyond are repeated to perform a process for selecting songs and associating them with a tempo curve.

If, on the other hand, the reproduction list generation section 16 decides in step S107 that a finishing procedure is received, the process shown in FIG. 6 comes to an end. The reproduction list generation section 16 then generates an extended playlist, which is described with reference to FIG. 5, in accordance with the selected tempo curve and the songs selected and associated with the selected tempo curve, and stores the generated extended playlist in the extended playlist storage section 23.

As described above, the user of the audio player according to the present embodiment can select a reproduction tempo change pattern, which indicates changes in the tempo of songs to be reproduced and represents a load pattern for an exercise that the user intends to do. Further, the user can select target songs in association with the tempo curve representing the reproduction tempo change pattern, create an extended playlist in accordance with the selected reproduction tempo change pattern and selected songs, and use the created extended playlist.

As regards the audio player according to the present embodiment, the procedures for selecting a tempo curve representing a reproduction tempo change pattern and selecting songs in association with the selected tempo curve are simple. The user can make such selections with ease, for instance, by placing the cursor over a target item and performing a finalization procedure or by performing a drag-and-drop procedure.

The examples shown in FIGS. 7 and 8 have been described on the assumption that the complex exercise pattern is selected as a tempo curve. However, even if, for instance, the hill pattern is selected, the user can make song selections in accordance with the hill pattern, and allow the reproduction list generation section 16 to generate an extended playlist in accordance with the pattern and song selections and store the generated playlist when virtually the same process is performed as is performed in the case where the complex exercise pattern is selected.

In other words, even when the hill mode is selected as a tempo curve as indicated in FIG. 9, the user can make a song selection in association with the hill mode. In this case, the product of song reproduction time and average tempo represents the number of steps for the entire song. Therefore, when the song is moved to a destination on the tempo curve representing a tempo that differs from the average tempo of the song, the reproduction list generation section 16 can equalize the area of the rectangle at the move destination with that of the original rectangle.

When the hill mode is selected as a tempo curve, the tempo varies for a predetermined period of time no matter whether a song is associated with any part. Even in the above case, however, the reproduction list generation section 16 equalizes the area of a rectangle representing the song associated with the tempo curve with that of the original rectangle. In this case, too, it is necessary to simply fill the area of the tempo curve with the areas of rectangles or other figures representing songs. Therefore, the user can select appropriate songs intuitively.

The extended playlist is generated after adjusting the reproduction tempo and reproduction time as occasion demands in accordance with a selected tempo curve and songs selected and associated with the selected tempo curve. Therefore, when a selected song is to be associated with a selected tempo curve, the selected song might be associated with a portion of the tempo curve that disagrees with the average tempo of the selected song. Thus, an extended playlist might be generated in accordance with the above operation. If the song is reproduced in accordance with such an extended playlist, the reproduced song may sound like a different song because the employed reproduction tempo quite differs from the original one.

The reproduction list generation section 16 can notify the user of the degree of a difference between the original reproduction tempo of a selected song and the tempo of a portion of the tempo curve with which the selected song is associated. The reproduction list generation section 16 can change the mode of the rectangle or other figure representing a song to notify the user of the difference between the average tempo of the song and the tempo of a portion of the tempo curve with which the song is associated. For example, the rectangle or other figure representing the song may be in green if the difference is 10% or smaller, in yellow if the difference is between 10% and 20%, and in red if the difference is 20% or greater. If the tempo difference is unduly great, the user may be allowed to change the selected songs or apply other necessary changes in a flexible manner.

[Fitness Information (Exercise Amount Information) Calculation]

As indicated by the process in step S105 in FIG. 6 and by the display of fitness information about a song 41$f$ in FIG. 8, the reproduction list generation section 16 can cause the display device 40 to display the fitness information about a selected song. Further, as indicated by the process in step S106 in FIG. 6 and by the display of fitness information about a tempo curve 41$h$ in FIG. 8, the reproduction list generation section 16 can cause the display device 40 to display fitness information on the assumption that an exercise is performed to all songs that are selected and associated with the selected tempo curve.

The fitness information (exercise amount information) displayed as described above includes the number of steps and distance. The number of steps can be determined as the product of song length and average tempo. The distance can be determined as the product of the number of steps and the step of the user. As regards the step, the user should measure the step in advance and input the measured step value through the operating control section 70. In the case of walking, for example, the step may be determined by multiplying the user's height by 0.45. In the case of running, on the other hand, the step may be determined by multiplying the user's height by 0.5. As regards the height, the user should measure the height in advance and input the measured height value through the operating control section 70.

The caloric expenditure can be calculated, for instance, from the relationship between walking velocity and expended energy. FIG. 10 shows an example to indicate how the caloric expenditure is calculated from the relationship between walking velocity and expended energy.

As indicated by Equation (1) in FIG. 10, the expended energy E (kcal/min) can be calculated from weight W (kg) and walking velocity V (miles/h). When the measure of walking velocity V in Equation (1) in FIG. 10 is changed from miles/h to km/h, Equation (2) in FIG. 10 is obtained.

When the user walks to a song having a tempo of y (beats/min) and a length of x (min), the walking velocity V is expressed as the product of the coefficient 0.06, tempo y, and step d (m) as indicated by Equation (3) in FIG. 10. The caloric expenditure C (kcal) is expressed as the product of expended energy E and song length (song reproduction time) x as indicated by Equation (4) in FIG. 10.

When Equations (2) and (3) in FIG. 10 are substituted into Equation (4) in FIG. 10, it is obvious from Equation (5) in FIG. 10 that the caloric expenditure C can be calculated from the weight W, song tempo y, step d, song length (song reproduction time) x, constant (0.03), and coefficient (0.00000468).

If, for instance, the user having a weight of 50 kg and a step of 0.7 m walks to a song having a tempo of 120 beats/min and a length of 5 min, Equation (5) in FIG. 10 indicates that the user's caloric expenditure is approximately 15 kcal.

When the caloric expenditure C is to be calculated from Equation (5) in FIG. 10, the user's weight W is also demanded. The user should also input the user's height W in advance from the operating control section 70 for storage. More specifically, the physical information about the user, such as the weight, height, and step, should be measured in advance, input from the operating control section 70, and stored in the nonvolatile memory 14 for use.

The relationship between walking velocity and expended energy is described in detail, for instance, in "Fundamental Kinesiology, Sixth Edition" (Ishiyaku Publishers, Inc.). In this book, a relational expression is derived from a quadratic curve that indicates the relationship between walking and caloric expenditure. However, the quadratic curve may be approximated by a linear curve (straight line). Further, the caloric expenditure may be calculated from a relational expression that is derived from the linear curve.

The caloric expenditure (expended energy) can also be calculated from expended energy per minute. Another method is to calculate the caloric expenditure from a metabolic equivalent (MET) level, which is a value indicating physical activity intensity that is defined for each exercise. These methods are described in detail, for instance, in Japanese Patent Application No. 2005-352948.

Approximate caloric expenditure may be calculated from the equation 0.5×weight×distance when the user walks for exercise or from the equation 1.0×weight×distance when the user runs for exercise. It goes without saying that caloric expenditure may also be calculated from some other theory or calculation formula. Further, the amount of fat burn, exercise continuation time, and other information may be acquired and displayed as fitness information in addition to caloric expenditure, number of steps, distance, and the like.

The embodiment described above assumes that selectable songs are represented by rectangles in the song list display area 41c, which use the horizontal and vertical axes to indicate the reproduction time and average tempo, respectively. However, the present invention is not limited to the use of such a method. For example, at least the reproduction time and average tempo may be associated with each song listing and displayed for selection. For example, a list of text information indicating the reproduction time and average tempo may be displayed so that songs can be selected from the list.

Alternative (1) would be to display a list of selectable songs with which the overall tempo (the product of the average tempo and reproduction time) is associated, and allow the user to select songs from the list. Alternative (2) would be to display a list of selectable songs that are represented by rectangles whose area indicates the overall tempo, and allow the user to select songs from the list.

When alternative (1) is used, it is possible, for instance, to display overall tempo values in the order from the lowest to the highest, place the cursor over a target overall tempo value to display the song name, artist name, release year, and other information, and select songs while confirming the displayed information. It goes without saying that the listings can be rearranged by sorting them by song name, artist name, tempo, or the like.

When alternative (2) is used, it is possible to display rectangles whose areas correspond to the overall tempo values of selectable songs as is the cases shown in FIGS. 7 to 9, place the cursor over a target rectangle to display the song name, artist name, release year, and other information, and select songs while confirming the displayed information. Again, it goes without saying that the listings can be rearranged by sorting them by song name, artist name, tempo, or the like.

As described above, a list of selectable songs may be, for example, a previously used list that displays text information to indicate a song name, reproduction time, and average tempo, a list that indicates overall tempo values for song selection purposes, or a list that displays rectangles having areas corresponding to overall tempo values for selection purposes. In other words, the list of selectable songs may be used to display notable information that helps the user to select songs easily and accurately.

When a part of a selected song is to be reproduced as explained with reference to FIG. 5B, the user should input the information indicating a reproduction portion, for instance, through the tempo curve input section 31. When, for instance, the first 50% portion is to be reproduced, "0.0 to 0.5" should be input. When a 60% portion following the first 40% portion is to be reproduced, "0.4 to 1.0" should be input. When a 50% portion following the first 20% portion is to be reproduced, "0.2 to 0.7" should be input. Anyway, a target song should be selected while specifying a reproduction portion of it. It goes without saying that the reproduction portion can be designated not only by specifying the portion as described above, but also by specifying time, conceptually specifying with a rectangle or other figure, or by using various other input methods.

The embodiment described above assumes that the present invention is applied to a portable audio player. However, the present invention is not limited to the use of a portable audio player. The present invention can be applied to a fitness apparatus incorporating a music reproduction device and to various other apparatus that create an extended playlist while associating a song list for providing exercise load control with a reproduction tempo curve intuitively and easily. Consequently, the present invention is applicable to both a portable music reproduction device and a stationary music reproduction device.

As regards an extended playlist generation scheme, that is, a scheme for generating an extended playlist by selecting a tempo curve and selecting songs in association with the selected tempo curve to adjust the reproduction tempo and reproduction time in accordance with the selected tempo curve, the present invention can also be applied to an apparatus having no audio reproduction function, such as a personal computer and a personal digital assistant or other portable information terminal.

The reproduction list generation section 16, display processing section 42, tempo control section 51, and audio processing section 62 are functional blocks shown in FIG. 2. However, when these blocks are implemented by hardware, a series of the associated processes can be performed by hardware. Further, the present invention can be incorporated into various electronic apparatus by creating a program/software that performs the process depicted by FIG. 6, and incorporating the program/software into the various electronic apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A content reproduction list generation device comprising:
   an operation section;
   a storage section configured to store a change pattern indicating reproduction tempo changes during content reproduction; and
   a reproduction list generation section configured to specify a specified change pattern in accordance with an input into the operation section, associate content with the specified change pattern, and generate a content reproduction list for informing a reproduction section of the reproduction order and reproduction tempo of content to be reproduced in accordance with the specified change pattern and the associated content, further comprising
   a display section,
   wherein the reproduction list generation section causes the display section to display a list of pieces of content that can be associated with the change pattern, and an overall tempo, which is the product of an average tempo and a reproduction time of each piece of content displayed in the list, and associates specific pieces of content, which are among the pieces of content displayed in the list, with the change pattern in accordance with an input into the operation section.

2. The content reproduction list generation device according to claim 1, further comprising
   a display section,
   wherein the reproduction list generation section causes the display section to display the change pattern two-dimensionally while plotting time along a horizontal axis and the reproduction tempo along a vertical axis.

3. The content reproduction list generation device according to claim 1, wherein the reproduction list generation section adjusts the specified change pattern in accordance with an input into the operation section.

4. The content reproduction list generation device according to claim 1, wherein in accordance with physical information about a user and the content reproduction list, the reproduction list generation section calculates exercise amount information indicating an exercise amount on the assumption that the user performs an exercise to the content reproduced in compliance with the content reproduction list.

5. The content reproduction list generation device according to claim 1, further comprising
   a display section,
   wherein the reproduction list generation section causes the display section to display a list of pieces of content that can be associated with the change pattern and an average tempo and a reproduction time of each piece of content displayed in the list, and associates specific pieces of content, which are among the pieces of content displayed in the list, with the change pattern in accordance with an input into the operation section.

6. The content reproduction list generation device according to claim 1, wherein in accordance with physical information about a user and the content reproduction list, the reproduction list generation section calculates exercise amount information on the assumption that the user performs an exercise to one of pieces of content reproduced in compliance with the content reproduction list.

7. The content reproduction list generation device according to claim 1, further comprising
   a display section,
   wherein the reproduction list generation section causes the display section to display content that can be associated with the change pattern, and changes the mode of the content displayed in the display section in accordance with an average tempo of the content displayed in the display section and a reproduction tempo of the change pattern.

8. The content reproduction list generation device according to claim 1, further comprising:
   a tempo control section configured to generate control information relating to at least one of the reproduction order, reproduction tempo, and reproduction time of content in accordance with the content reproduction list; and
   a reproduction section configured to reproduce content in accordance with the control information.

9. A content reproduction list generation device comprising:
   an operation section;
   a storage section configured to store a change pattern indicating reproduction tempo changes during content reproduction; and
   a reproduction list generation section configured to specify a specified change pattern in accordance with an input into the operation section, associate content with the specified change pattern, and generate a content reproduction list for informing a reproduction section of the reproduction order and reproduction tempo of content to be reproduced in accordance with the specified change pattern and the associated content, further comprising
   a display section,
   wherein the reproduction list generation section causes the display section to display figures whose area represents an overall tempo, which is the product of an average tempo and a reproduction time of each piece of content that can be associated with the change pattern, and
   when a specific figure is selected from among the displayed figures in accordance with an input into the operation section, the reproduction list generation section associates the change pattern with the content corresponding to the selected specific figure.

10. The content reproduction list generation device according to claim 9, wherein the figure is a rectangle whose two sides correspond to the average tempo and the reproduction time.

11. A content reproduction list generation method comprising the steps of:
    selecting a change pattern indicating changes in a reproduction tempo for content reproduction in accordance with an input into an operation section;
    associating content with the selected change pattern;
    generating, in accordance with the selected change pattern and the associated content, a content reproduction list for informing a reproduction section of the reproduction order and
    reproduction tempo of content to be reproduced;
    further comprising the step of:
    causing the display section to display figures whose area represents an overall tempo, which is the product of an average tempo and a reproduction time of each piece of content that can be associated with the change pattern,
    wherein when a specific figure is selected from among the displayed figures in accordance with an input into the operation section, the association step associates the change pattern with content corresponding to the selected specific figure.

12. The content reproduction list generation method according to claim 11, further comprising the step of
causing a display section to display the change pattern two-dimensionally while plotting time along a horizontal axis and the reproduction tempo along a vertical axis.

13. The content reproduction list generation method according to claim 11, further comprising the step of
adjusting the selected change pattern in accordance with an input into the operation section.

14. The content reproduction list generation method according to claim 11, further comprising the step of
calculating, in accordance with physical information about a user and the content reproduction list, exercise amount information indicating an exercise amount on the assumption that the user performs an exercise to content reproduced in compliance with the content reproduction list.

15. The content reproduction list generation method according to claim 11, wherein the figure is a rectangle whose two sides correspond to the average tempo and the reproduction time.

16. The content reproduction list generation method according to claim 11, further comprising the step of
causing the display section to display content that can be associated with the change pattern, and changing the mode of the content displayed by the display section in accordance with the average tempo of the content displayed by the display section and the reproduction tempo of the change pattern.

17. The content reproduction list generation method according to claim 11, further comprising the steps of:
generating control information relating to at least one of a reproduction order, a reproduction tempo, and a reproduction time of content in accordance with the content reproduction list; and
reproducing content in accordance with the control information.

* * * * *